US010846967B2

(12) United States Patent
Usi et al.

(10) Patent No.: US 10,846,967 B2
(45) Date of Patent: Nov. 24, 2020

(54) SYSTEMS AND METHODS FOR THRESHOLD DETECTION OF A WIRELESS DEVICE

(71) Applicant: Universal City Studios, LLC., Universal City, CA (US)

(72) Inventors: Matthew Usi, Orlando, FL (US); Tomas Trujillo, Orlando, FL (US); Mark Traynor, Orlando, FL (US); Daniel Miller, Lake Mary, FL (US)

(73) Assignee: Universal City Studio LLC, Universal City, CA (US)

( * ) Notice: Subject to any disclaimer, the term of this patent is extended or adjusted under 35 U.S.C. 154(b) by 0 days.

(21) Appl. No.: 16/196,967

(22) Filed: Nov. 20, 2018

(65) Prior Publication Data
US 2019/0180540 A1    Jun. 13, 2019

Related U.S. Application Data

(60) Provisional application No. 62/598,302, filed on Dec. 13, 2017.

(51) Int. Cl.
| G07C 9/38 | (2020.01) |
|---|---|
| G07C 9/00 | (2020.01) |
| G08B 7/06 | (2006.01) |
| H04W 4/029 | (2018.01) |
| H04L 12/26 | (2006.01) |
| H04W 4/021 | (2018.01) |
| G07C 9/20 | (2020.01) |
| H04W 4/80 | (2018.01) |
| G07C 9/28 | (2020.01) |

(52) U.S. Cl.
CPC .......... *G07C 9/38* (2020.01); *G07C 9/00309* (2013.01); *G07C 9/20* (2020.01); *G08B 7/06* (2013.01);
(Continued)

(58) Field of Classification Search
None
See application file for complete search history.

(56) References Cited

U.S. PATENT DOCUMENTS

| 5,946,444 A | 8/1999 | Evans et al. |
|---|---|---|
| 6,142,368 A | 11/2000 | Mullins et al. |

(Continued)

FOREIGN PATENT DOCUMENTS

| CN | 106780926 A | 5/2017 |
|---|---|---|
| JP | 2003288472 A | 10/2003 |

(Continued)

OTHER PUBLICATIONS

U.S. Appl. No. 15/826,357, filed Nov. 29, 2017, Wei Yeh.
(Continued)

*Primary Examiner* — Carlos Garcia
(74) *Attorney, Agent, or Firm* — Fletcher Yoder, P.C.

(57) ABSTRACT

A threshold detection system may include multiple wireless devices, wherein each individual wireless device may include a transmitter to transmit a wireless signal. The threshold detection system may also include a receiver array of multiple receivers to detect the wireless signal of each individual wireless device in response to the individual wireless device being in range of the receiver array. The threshold detection system may also include a controller to receive detection signals from the receivers and determine a direction of travel of an individual wireless device relative to a predetermined threshold based on the received detection signals. The controller may also determine that the individual wireless device has crossed the predetermined threshold and trigger an audio or visual alert in response to the determination that the wireless device has crossed the predetermined threshold and is traveling in an exit direction based on the determined direction of travel.

21 Claims, 4 Drawing Sheets

(52) U.S. Cl.
CPC .............. *H04L 43/16* (2013.01); *H04W 4/021*
(2013.01); *H04W 4/029* (2018.02); *G07C 9/28*
(2020.01); *G07C 2009/00341* (2013.01);
*H04W 4/80* (2018.02)

(56) References Cited

U.S. PATENT DOCUMENTS

| | | |
|---|---|---|
| 6,307,952 B1 | 10/2001 | Dietz |
| 6,346,886 B1 | 2/2002 | De La Huerga |
| 6,352,205 B1 | 3/2002 | Mullins et al. |
| 6,474,557 B2 | 11/2002 | Mullins et al. |
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,888,576 B2 | 11/2014 | Briggs et al. |
| 8,913,011 B2 | 12/2014 | Barney et al. |
| 8,915,785 B2 | 12/2014 | Barney et al. |
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 9,002,264 B2 | 4/2015 | Zhang |
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |

(56) References Cited

U.S. PATENT DOCUMENTS

| | | |
|---|---|---|
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,149,717 B2 | 10/2015 | Barney et al. |
| 9,162,148 B2 | 10/2015 | Barney et al. |
| 9,162,149 B2 | 10/2015 | Weston et al. |
| 9,178,569 B2 | 11/2015 | Chakravarty et al. |
| 9,186,585 B2 | 11/2015 | Briggs et al. |
| 9,196,964 B2 | 11/2015 | Baringer |
| 9,207,650 B2 | 12/2015 | Narendra et al. |
| 9,215,592 B2 | 12/2015 | Narendra et al. |
| 9,225,372 B2 | 12/2015 | Butler |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,383,730 B2 | 7/2016 | Prestenback |
| 9,393,491 B2 | 7/2016 | Barney et al. |
| 9,393,500 B2 | 7/2016 | Barney et al. |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,887 B1 | 11/2016 | Soleimani |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,697,656 B2 | 7/2017 | Trani |
| 9,706,924 B2 | 7/2017 | Greene |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,858,739 B1 * | 1/2018 | Johnson ............... H04W 76/10 |
| 9,860,710 B2 * | 1/2018 | Buttolo ............... H04W 4/029 |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,909,896 B2 | 3/2018 | Bass et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,949,219 B2 | 4/2018 | Belogolovy |
| 9,972,894 B2 | 5/2018 | Dion et al. |
| 9,993,724 B2 | 6/2018 | Barney et al. |
| 1,001,079 A1 | 7/2018 | Weston et al. |
| 1,002,262 A1 | 7/2018 | Barney et al. |
| 10,269,198 B2 * | 4/2019 | Saso ............... G07C 9/00158 |
| 10,338,679 B2 * | 7/2019 | Weston ............... A41D 11/00 |
| 10,341,616 B2 * | 7/2019 | Lee ............... H04N 5/77 |
| 10,388,093 B2 * | 8/2019 | Saso ............... G07C 9/00158 |
| 2004/0085449 A1 * | 5/2004 | Millet ............... H04N 7/18 |
| | | 348/152 |
| 2006/0046765 A1 * | 3/2006 | Kogure ............... H04W 52/28 |
| | | 455/522 |
| 2010/0274434 A1 * | 10/2010 | Donnelli ............... G08G 1/20 |
| | | 701/31.4 |
| 2012/0234058 A1 | 9/2012 | Neil et al. |
| 2012/0286938 A1 | 11/2012 | Cote et al. |
| 2013/0324059 A1 | 12/2013 | Lee et al. |
| 2014/0049361 A1 | 2/2014 | Ahearn et al. |
| 2014/0122170 A1 | 5/2014 | Padgett et al. |
| 2014/0162693 A1 | 6/2014 | Wachter et al. |
| 2015/0046202 A1 | 2/2015 | Hunt |
| 2015/0078140 A1 | 3/2015 | Riobo Aboy et al. |
| 2015/0138556 A1 | 5/2015 | LeBoeuf et al. |
| 2015/0180816 A1 * | 6/2015 | Varoglu ............... H04L 67/18 |
| | | 709/206 |
| 2015/0194817 A1 | 7/2015 | Lee et al. |
| 2015/0236551 A1 | 8/2015 | Shearer et al. |
| 2015/0255226 A1 | 9/2015 | Rouvala et al. |
| 2015/0312517 A1 | 10/2015 | Hoyt et al. |
| 2015/0336013 A1 | 11/2015 | Stenzler et al. |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0027226 A1 | 1/2016 | Gigl et al. |
| 2016/0067600 A1 | 3/2016 | Barney et al. |
| 2016/0144280 A1 | 5/2016 | Pawlowski et al. |
| 2016/0170998 A1 | 6/2016 | Frank et al. |
| 2016/0182165 A1 | 6/2016 | Margon et al. |
| 2016/0203663 A1 | 7/2016 | Proctor |
| 2016/0217496 A1 | 7/2016 | Tuchman et al. |
| 2016/0226610 A1 | 8/2016 | Pinzon Gonzales, Jr. |
| 2016/0307398 A1 | 10/2016 | Walker et al. |
| 2016/0321548 A1 | 11/2016 | Ziskind et al. |
| 2016/0373522 A1 | 12/2016 | Carlos et al. |
| 2017/0046889 A1 | 2/2017 | Clemente et al. |
| 2017/0091850 A1 | 3/2017 | Alvarez et al. |
| 2017/0093463 A1 | 3/2017 | Wang et al. |
| 2017/0103596 A1 | 4/2017 | Holderness et al. |
| 2017/0115018 A1 | 4/2017 | Mintz |
| 2017/0132438 A1 | 5/2017 | Cletheroe et al. |
| 2017/0140592 A1 | 5/2017 | Pluss et al. |
| 2017/0150533 A1 | 5/2017 | Alipour et al. |
| 2017/0154485 A1 | 6/2017 | Dumas et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0331509 A1 | 11/2017 | Gollakota et al. |
| 2017/0340961 A1 | 11/2017 | Weston et al. |
| 2017/0348593 A1 | 12/2017 | Barney et al. |
| 2017/0358957 A1 | 12/2017 | Mitcheson et al. |

(56) References Cited

U.S. PATENT DOCUMENTS

| | | |
|---|---|---|
| 2017/0361236 A1 | 12/2017 | Barney et al. |
| 2017/0373526 A1 | 12/2017 | Huang et al. |
| 2018/0014385 A1 | 1/2018 | Wein |
| 2018/0078853 A1 | 3/2018 | Barney et al. |
| 2018/0214769 A1 | 8/2018 | Briggs et al. |
| 2018/0318723 A1 | 11/2018 | Weston |
| 2018/0339226 A1 | 11/2018 | Barney et al. |

FOREIGN PATENT DOCUMENTS

| | | | |
|---|---|---|---|
| JP | 2004126791 A | 4/2004 | |
| JP | 2005267179 A | 9/2005 | |
| JP | 2010000178 A | 1/2010 | |
| JP | 2012244846 A | 12/2012 | |
| JP | 2013188019 A | 9/2013 | |
| JP | 6152919 B1 | 6/2017 | |
| KR | 101797231 B1 | 11/2017 | |
| WO | 2014113882 A1 | 7/2014 | |

OTHER PUBLICATIONS

U.S. Appl. No. 15/833,839, filed Dec. 6, 2017, Travis Jon Cossairt.
U.S. Appl. No. 15/861,502, filed Jan. 3, 2018, Wei Cheng Yeh.
U.S. Appl. No. 15/874,671, filed Jan. 18, 2018, Wei Cheng Yeh.
U.S. Appl. No. 15/882,761, filed Jan. 29, 2018, Wei Cheng Yeh.
U.S. Appl. No. 15/882,721, filed Jan. 29, 2018, Wei Cheng Yeh.
U.S. Appl. No. 15/882,788, filed Jan. 29, 2018, Wei Cheng Yeh.
U.S. Appl. No. 15/882,738, filed Jan. 29, 2018, Travis Jon Cossairt.
U.S. Appl. No. 15/972,940, filed May 7, 2018, Unavailable.
U.S. Appl. No. 15/995,633, filed Jun. 1, 2018, Unavailable.

\* cited by examiner

SYSTEMS AND METHODS FOR THRESHOLD DETECTION OF A WIRELESS DEVICE

CROSS-REFERENCE TO RELATED APPLICATIONS

This application claims priority from and the benefit of U.S. Provisional Application No. 62/598,302, entitled "SYSTEMS AND METHODS FOR THRESHOLD DETECTION OF A WIRELESS DEVICE," filed Dec. 13, 2017, which is hereby incorporated by reference in its entirety for all purposes.

FIELD OF DISCLOSURE

The present disclosure relates generally to wireless device detection. More specifically, embodiments of the present disclosure relate to systems and methods for detecting when a wireless device crosses a threshold.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless transmitters and receivers have been utilized in devices in a plethora of scenarios. Some implementations include communication, presence detection, and other desirable services accommodated by wireless transmissions and receptions. Additionally, the devices implementing wireless transmitters and/or receivers range from handheld and/or worn devices to vehicles and stationary installations.

Wireless transmitters and receivers use a wide variety of radio frequency (RF) bands. In many devices, implementations such as radio frequency identification (RFID), near-field communication (NFC), Bluetooth, global positioning system (GPS), very high frequency (VHF), and so forth are used to communicate with other wireless capable devices. Certain communications are one-way or two-way and may have an operating range specific to the implementation. When operating within range, transmitters and/or receivers may use passive or active communication for proximity detection to discover when a transmitter and/or receiver is nearby.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a threshold detection system may include multiple wireless devices, wherein each individual wireless device may include a transmitter to transmit a wireless signal. The threshold detection system may also include a receiver array of multiple receivers to detect the wireless signal of each individual wireless device in response to the individual wireless device being in range of the receiver array. The threshold detection system may also include a controller to receive detection signals from the receivers and determine a direction of travel of an individual wireless device relative to a predetermined threshold based on the detection signals. The controller may also determine that the individual wireless device has crossed the predetermined threshold and trigger an audio or visual alert in response to the determination that the wireless device has crossed the threshold and is traveling in an exit direction based on the direction of travel.

In another embodiment, a method of detecting a wireless device may include receiving, via one or more receivers, a wireless signal from a device, wherein the wireless signal comprises a Bluetooth signal, a WiFi signal, or a combination thereof. The method may also include determining a direction of travel of the device based at least in part on the wireless signal and determining that the device has crossed a threshold in a predetermined direction based at least in part on the wireless signal and the determined direction of travel. The method may also include, in response to determining that the device has crossed the threshold, outputting a visual or aural notification.

In another embodiment, a system may include multiple receivers to detect a wireless signal from a device and determine a position of the device in the vicinity of a threshold. The system may also include a controller to send a query signal to the device, wherein the query signal, when received by the device, is shortens a time between subsequent transmissions, corresponding to the wireless signal, of the device. The controller may also determine whether the device has moved from a first side of the threshold to a second side of the threshold based at least in part on the wireless signal, and, in response to determining that the device has moved from the first side of the threshold to the second side of the threshold, output an identification of the position of the device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

Some implementations of wireless transmitters and receivers include communication, presence detection, and other desirable services (e.g., notifications, payment) accommodated by wireless transmissions and receptions. Such services may use a wide variety of radio frequency (RF) bands such as those used in radio frequency identification (RFID), near-field communication (NFC), Wi-Fi, Bluetooth, global positioning system (GPS), very high frequency (VHF), and the like. Additionally, the devices implementing wireless transmitters and/or receivers range from handheld and/or worn devices to vehicles and stationary installations.

In general, communications are one-way or two-way and may have an operating range specific to the implementation. When operating within range, a receiver or transceiver, with combined functions of both a transmitter and receiver, may use passive or active communication for proximity detection to discover when another transmitter, receiver, or transceiver is nearby. In general, a single receiver may be omnidirectional and detect a signal strength of a nearby transmitter. Such a method of detection may allow for distance measurements and communication, but may fail to identify a direction toward or traversing of a threshold by a wireless device. It should be noted that references to transmitters and receivers in the present disclosure may include separate devices or components of a single device (e.g., components of a transceiver).

In particular embodiments, the wireless devices may be distributed to guests (e.g., an individual wireless device distributed to an individual guest) upon ticket purchase and/or entry to a venue, such as an amusement park. The wireless devices may be reusable, such that the venue instructs guests to return the wireless devices before leaving the venue in the interest of having the wireless devices generally stay within a perimeter of the venue. Nonetheless, some guests may inadvertently leave the venue with the wireless device, which results in accruing replacement costs for lost wireless devices. In particular embodiments, the wireless devices are configured to operate within the venue and have limited functionality outside of the venue. Because such devices have limited functionality outside of the venue, alerts indicating that the wireless device has crossed a threshold and is about to exit the venue may prompt the guest to return the wireless device to a central return receptacle.

As provided herein, in one embodiment, an array of receivers implemented in a threshold detection system may sense when a wireless device has crossed a threshold. Such a threshold may be the entrance/exit to an amusement park or attraction, a store, restaurant, or any other desired crossing point of interest. In general, the threshold may be considered to be an imaginary line or area separating two areas (e.g., geographic areas). The threshold detection system may then record the device, sound an alert, send a notification, enact a user interface, and/or any other desired response. In some embodiments, the threshold detection system may be utilized as part of a loss prevention, alert, and/or deterrent system to aid in alerting when wireless devices have crossed a threshold. In certain embodiments, a combination of detection characteristics may be utilized to specifically locate the wireless device within the monitored range and indicate the location as a graphical overlay on an image of the monitored space.

Figure 1:
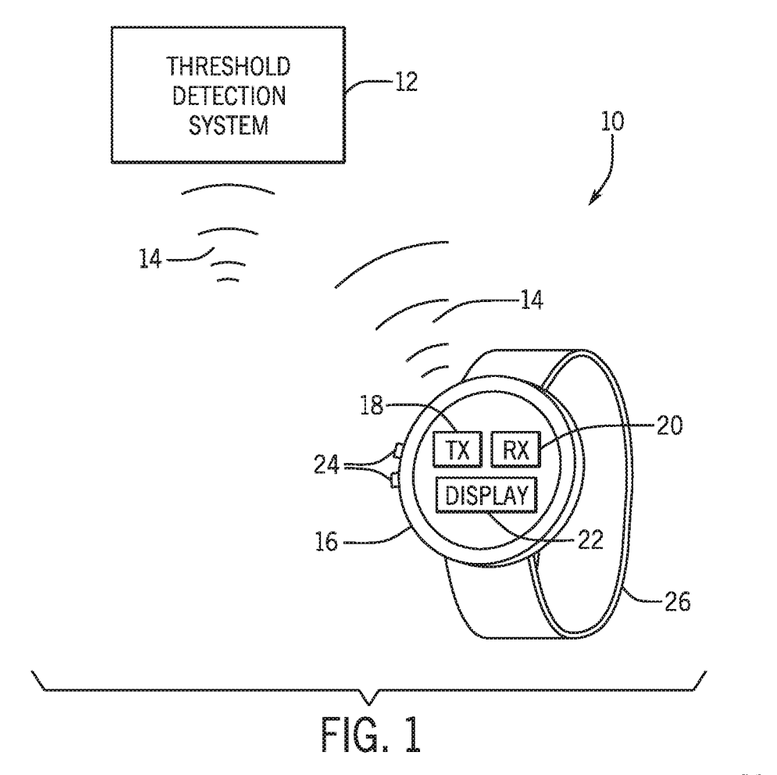
FIG. 1 is a wireless system including wireless device and a receiver array, in accordance with an aspect of the present disclosure.

Referring now to FIG. 1, a wireless system 10 may include a threshold detection system 12 communicating via wireless signals 14 with a wireless device 16. The wireless device 16 may be any suitable portable electronic device having a transmitter 18 and/or receiver 20. In some embodiments, the transmitter 18 and receiver 20 may be implemented together as a transceiver. The wireless device may use one or more frequency bands to communicate including NFC, Wi-Fi, Bluetooth, GPS, and so forth. As stated above, certain implementations and frequency bands may have optimal ranges of operation. In one embodiment the wireless device 16 may employ a medium range communication (e.g., Bluetooth, Wi-Fi) that may be detected by a threshold detection system 12. Such medium range communication may have effective ranges of 5-100 feet, however shorter and longer range implementations may also be used. The wireless device 16 may periodically broadcast, within its range, a wireless device identifier (e.g., universally unique identifier (UUID)). Such an identifier may also be unique to the implementation in which the wireless device 16 is used, such that other devices, which are not desired to be detected, are not registered as false alarms. For example, other devices not desired to be detected (e.g., mobile phones, tablets, and other devices not associated with the wireless system 10) may broadcast foreign wireless signals that may be received by the system 10 but that are not recognized or considered. The use of a wireless device identifier may prevent the threshold detection system 12 from registering or recognizing such other devices as a wireless device 16 of the wireless system 10. In some embodiments, foreign signals may return no action by the threshold detection system 12 or return a different action than that for a recognized wireless device 16 of the wireless system 10. Accordingly, as provided herein, the system 10 may recognize signals from devices 16 with UUIDs that are registered to the system 10 and may disregard signals from devices that do not have UUIDs that are registered to the system 10.

The wireless device 16 may include a display 22 (e.g., lights, a screen) and/or an interface 24 (e.g., keyboard, touchscreen, buttons). As stated above, the wireless device 16 may be a handheld device (e.g., a phone, tablet, electronic card), mounted, for example on a vehicle, or a worn device (e.g., a watch, necklace), also known as a wearable. To facilitate wearing or mounting the wireless device 16, a retaining feature 26 such as a bracelet, necklace, lanyard, or suction-cup mount may be used to secure the wireless device 16 in place. Other retaining features 26 may be used depending on implementation and/or desired location such as, but not limited to, screws, adhesive, clips, and/or friction locks. In certain embodiments, the wireless devices 46 are owned by a particular venue, such as an amusement park, and are distributed to guests.

Figure 2:
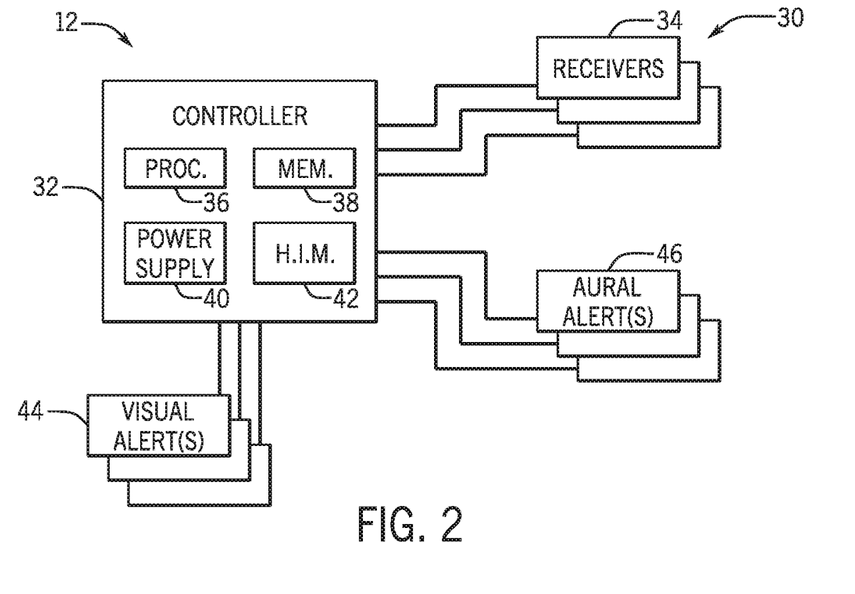
FIG. 2 is a block diagram of threshold detection system, in accordance with an aspect of the present disclosure.

As shown in FIG. 2, the threshold detection system 12 may include a receiver array 30 and a controller 32. The receiver array 30 may include multiple receivers 34 arranged about a threshold of interest to detect the wireless device 16

(which is representative of any number of like devices). Each receiver 34 may be connected, wirelessly or through a wired connection to the controller 32. The controller 32 may utilize one or more processors 36 and memory 38 to process the detections by the receivers 34. The processor 36 may include one or more general purpose microprocessors, one or more application specific integrated circuits (ASICs), one or more field programmable gate arrays (FPGAs), or any combination thereof. Further, the memory 38 may store data to be processed by the processor 36 and may include one or more tangible, non-transitory, computer-readable mediums. For example, the memory 38 may include random access memory (RAM), read only memory (ROM), rewritable non-volatile memory such as flash memory, hard drives, optical discs, and/or the like. Additionally, the controller 32 may include an internal or external power supply 40. As such, power may be supplied via an electrical power grid and/or via a battery. The power supply 40 may also include one or more transformers and may provide power to the receivers 34. Additionally, a human interface module 42 may be included to allow a technician to program the threshold detection system 12 and/or be notified when a programmed detection is registered (e.g., a wireless device 16 crossing a threshold).

In some embodiments, the controller 32 may be connected to one or more visual alerts 44 (e.g., display screens, lights, flags) and/or one or more aural alerts 46 (e.g., speakers, bells, whistles, sirens) to provide feedback when the wireless device 16 crosses the threshold. In some embodiments, the visual alerts 44 and/or aural alerts 46 may be directed specifically towards an identified location of the wireless device 16. For example, a spotlight or other identifying presentation may be shown over the location of the wireless device 16. Other special effects or alarms may also be initiated if the wireless device 16 crosses the threshold. Such effects and/or alerts may be customized depending on implementation. In some embodiments, the controller 12 may keep a record of various threshold crossings for multiple different wireless devices 16 and provide user-specific information or entertainment based on the record.

Figure 3:
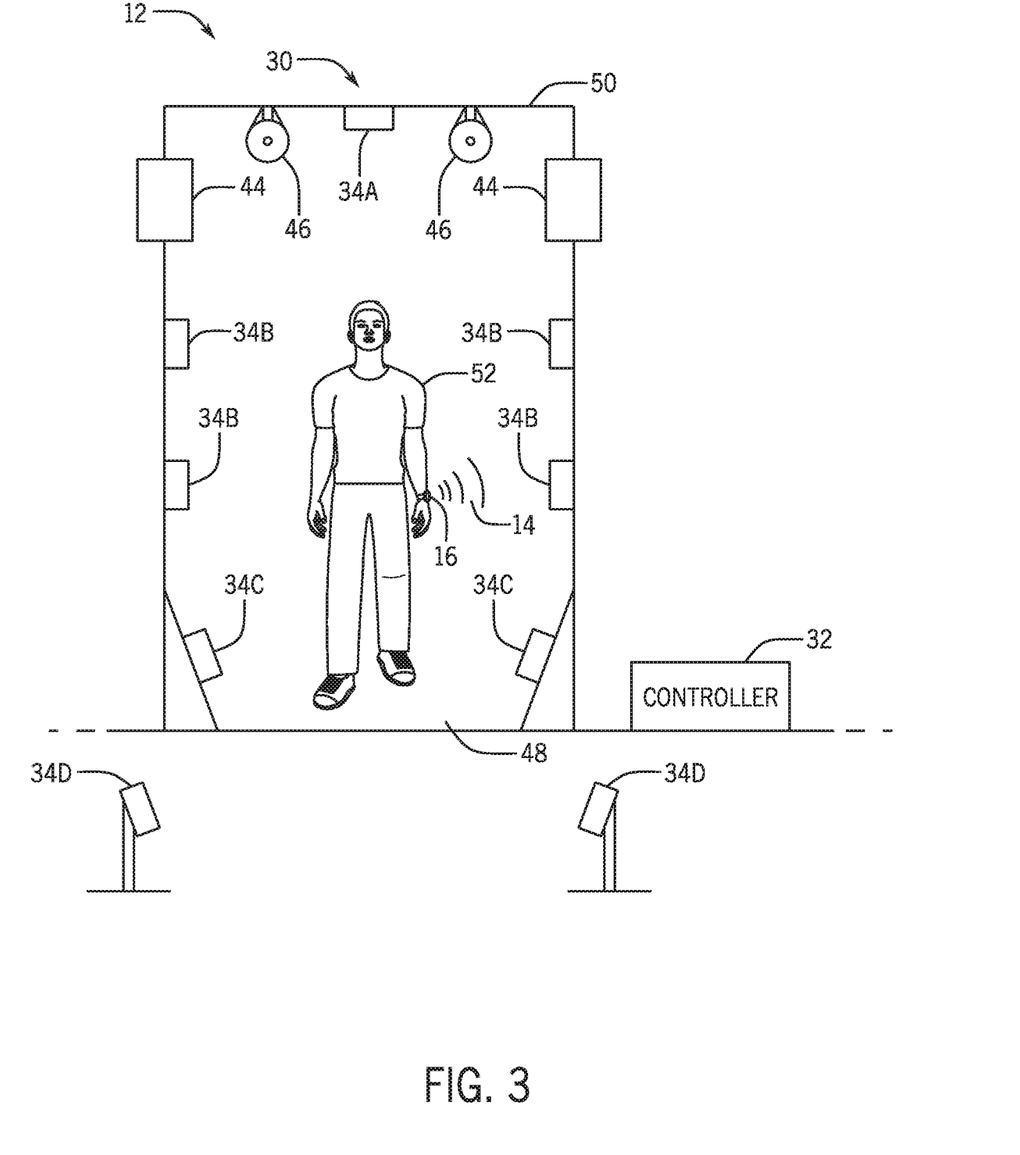
FIG. 3 is a perspective view of a receiver array of the threshold detection system, in accordance with an aspect of the present disclosure.

In general, each individual receiver 34 may detect that a wireless device 16 is in an area, but may not be configured or arranged to identify the wireless device 16 crossing a threshold 48 such as a doorway, linear plane, or other area of interest. The receiver array 30, as depicted in FIG. 3, may include multiple receivers 34 that are particularly arranged in order to provide adequate coverage of the threshold area. Additionally or alternatively, a single receiver 34 capable of directionally locating the source of a wireless signal 14 may also be used. Further, the range of the receivers 34 may be set such that wireless devices 16 adjacent to the receiver array 30, but not crossing the threshold 48, may not be registered. In one embodiment, the receivers 34 may be capable of an adjustable received signal strength indicator (RSSI). As such, the receivers 34 and/or controller 32 may be set to register signal strengths higher than a reference value. This may, in operation, regulate the range of the receiver array 30 and/or the range of a threshold crossing event to the threshold 48 and avoid false or inaccurate detections. The signal strength may further be used to help determine the direction of travel, for example, by measuring a change in signal strength over time. An increasing signal strength may, for example, indicate a direction of travel toward a particular receiver 34. Additionally, the receivers 34 may be angled and/or shielded in certain directions to focus detection in the threshold area of interest.

Furthermore, the receiver array 30 and/or controller 32 may identify a direction of travel of the wireless device 16 when crossing the threshold 48. In some embodiments, the receivers 34 of the receiver array 30 may be used to triangulate a position within the vicinity of the threshold 48 and track movement across the threshold 48 corresponding to the direction in which the wireless device 16 is traveling. For example, the threshold detection system 12 may identify and distinguish between when a wireless device 16 enters or exits from a designated area (e.g., an amusement park, store, restaurant, or attraction) based on a determined direction of travel or simply lingers in the vicinity of the threshold 48. The identification of directional movement of a wireless device 16 may also increase the accuracy of detected location and/or reduce false detections.

Threshold detections may be used for multiple different activities and/or effects. For example, a user in possession of a wireless device 16 may enter a queue for an attraction through a threshold detection system 12 and be automatically notified, for example via the wireless device 16 of a start time or wait time for the attraction. Additionally, a user may enter a store with a wireless device 16 and receive customized attention (e.g., customized based on previous threshold crossings and/or user settings) while browsing, for example, by a service representative, electronic interface, or the wireless device 16. Furthermore, the detection of the direction of movement of the wireless device 16 may yield further customized effects, for example proper salutations (e.g., hello or goodbye) upon entering or exiting. Moreover, the direction of travel at the entrance/exit to an amusement park, or section thereof, may assist in loss prevention by identifying and providing feedback of a wireless device 16 exiting through a threshold detection system 12, while ignoring or giving a different feedback in response to a wireless device 16 entering the amusement park.

In some embodiments, the receivers 34 and wireless devices 16 may communicate with two-way communication, for example, by logging the wireless device identifier, and keeping track of the wireless device 16 through one or more thresholds. Further, instructions to trigger aural alerts 46, visual alerts 44, and/or haptic alerts may be sent to the wireless device 16 in response to crossing a threshold 48 as an indication of the crossing. That is, the wireless device 16 may be configured to light up (e.g., activate a light source of the wireless device 16), sound an alert (e.g., activate a speaker of the wireless device 16), and/or vibrate (e.g., activate a haptic response system of the wireless device 16) in response to receiving a signal from the system 12 that the wireless device 16 has crossed a threshold 48. For example, if a guest has inadvertently placed the wireless device 16 in a handbag, the aural alerts 46, visual alerts 44, and/or haptic alerts may alert the guest to look in the handbag and find the wireless device 16. In some instances, for example Bluetooth communications, pairing between the threshold detection system 12 and the wireless device 16 may be implemented. As such, the wireless device identifier may be communicated to or pre-programmed into the threshold detection system 12 to allow the wireless device 16 to provide specific services. Furthermore, the threshold detection system 12 may be networked to a larger wireless network that may include multiple base stations, repeaters, receivers, controllers, and so forth, or operate separately from a network environment.

The receivers 34 may also be operated without pairing or the use of two-way communication, and instead, use one-way wireless communication. In such instances, the broadcasted wireless signal 14 from a wireless device 16, which may include the wireless device's identifier (e.g., UUID), may be detected by the receivers 34 without corresponding communication back to the wireless device 16. Additionally or alternatively, one-way wireless communication may also allow the threshold detection system 12 to operate within a network, when connected, but still operate when disconnected, or be used as a standalone system. Furthermore, two-way communication may be implemented while a network is active, and one-way communication if connection to the network is lost by the wireless device 16.

Additionally, the threshold detection system 12 may operate as a standalone system in conjunction with a separate network that also communicates with the wireless device 16. For example, two-way communication to the wireless device 16 may be implemented by the separate network, and a query signal may cause the wireless device 16 to enter a "hyper-beaconing" mode. This mode may cause the wireless device 16 to broadcast at a faster rate, for example every 100 milliseconds instead of every second. This faster broadcast rate may, in turn, allow for faster acquisition of a wireless signal 14 and more accurate monitoring of the threshold detection system 12. The query signal may be transmitted from any suitable transmitter and may be controlled via a separate system or the wireless system 10, for example via the controller 32. Furthermore, in some embodiments, a query signal may be transmitted via one-way communication to an area around the receiver array 30, and a wireless device 16 entering the area may detect the query signal and enter an increased beaconing rate mode (e.g., hyper-beaconing).

As depicted in FIG. 3, the receiver array 30, visual alerts 44, and aural alerts 46 may be located about a threshold 48 and mounted, at least partially, on a frame 50. In some embodiments, the wireless device 16 may be detected when passing through, under, and/or between the frame 50. Further, the frame 50 may be aligned with and/or contain within, at least partially, the threshold 48. As discussed above, the layout of the receivers 34 may be such that a wireless device 16 is sensed when a user 52 (e.g., a person or vehicle with a wireless device 16) crosses the threshold 48. In the illustrated embodiment, nine receivers 34 are arranged at various heights and distances from one another, including an overhead receiver 34A. Specifically, robust monitoring coverage of the threshold area is achieved in the illustrated embodiment by including an overhead receiver 34A above the threshold 48 (e.g., aimed down on the threshold area), four side receivers 34B (e.g., on either side of the threshold 48) positioned at different heights, two bottom receivers 34C on either side of the threshold 48 positioned near the base of the threshold 48 and generally angled/aimed toward the center of the threshold 48, and two standing receivers 34D positioned a distance away from (e.g., in front or behind) the threshold 48, and may be positioned near the ground, overhead and/or angled toward the threshold 48. Furthermore, the receivers 34 may be angled parallel, perpendicular, or at angle relative to the ground. For example, the overhead receiver 34A may be angled perpendicular to the ground, while a standing receiver 34D may be aimed approximately parallel to the ground. Note that the side receivers 34B may include pairs that are generally at the same height on either side, as illustrated. However, in other embodiments, each side receiver 34B may be at a different height. In accordance with the present disclosure, different arrangements utilizing more or fewer receivers 34 in various positions may be employed, for example, depending on the implementation of the threshold detection system 12. In one embodiment, redundant receivers 34 are provided at each location such that eighteen of the receivers 34 are employed. Further, the receivers 34 and/or frame 50 may be hidden from view and/or include a façade or themed design for entertainment and/or aesthetics. In some embodiments, the receiver array 30 may be plainly visible, for example, to as a reminder and/or notification of the threshold 48.

In some embodiments, because of the arrangement of receivers 34, one receiver 34 sensing a wireless device 16 may register a detection. As such, each receiver 34 may operate independently of the other receivers 34 in the receiver array 30. Further, multiple receivers 34 may yield redundancy to increase positive detections of threshold crossings. For example, should a single receiver 34 not detect the programmed criteria for a threshold crossing detection, another receiver 34 of the receiver array 30 may detect and register the crossing. In one example embodiment, the threshold detection system 12 may detect wireless devices 16 entering an unauthorized area and/or leaving a designated area via a threshold 48. In such a case, if one receiver 34 detects a wireless device 16, visual alerts 44 and/or aural alerts 46 may notify an attendant to check the threshold area for the offending wireless device 16.

Furthermore, in one embodiment, each receiver 34 in the receiver array 30 may be linked together or managed by a controller 32 as a group. In such a case, the controller 32 may use the multiple receivers 34 to triangulate (e.g., based on signal strength) a more precise position of the wireless device 16 crossing the threshold, thus, increasing accuracy of the detected location and/or direction of movement as well as reducing inaccurate detections. Additionally, the visual alerts 44 (e.g., lights and/or lasers) may shine towards the direction of the detected wireless device 16 for easier target acquisition. In one embodiment, an image of the threshold area may be captured and a probable location of the detected wireless device 16 highlighted within the image.

Additionally, the threshold detection system 12 may identify when a wireless device 16 has been placed into a particular threshold area by designating a zone of interest, and detecting a crossing of a threshold 48 into the zone. For example, the threshold detection system 12 may identify when a wireless device 16 has been placed into a locker, storage bin, and/or waste bin. Additionally, or alternatively the threshold detection system 12 may be used on bags (e.g., backpacks and purses). In one such an embodiment, a conveyor may pass bags over a threshold 48 or the bags may be placed into a bin (e.g., an open box or area) designated as a zone of interest to determine if a wireless device 16 of the wireless system 10 is present in one of the bags.

Figure 4:
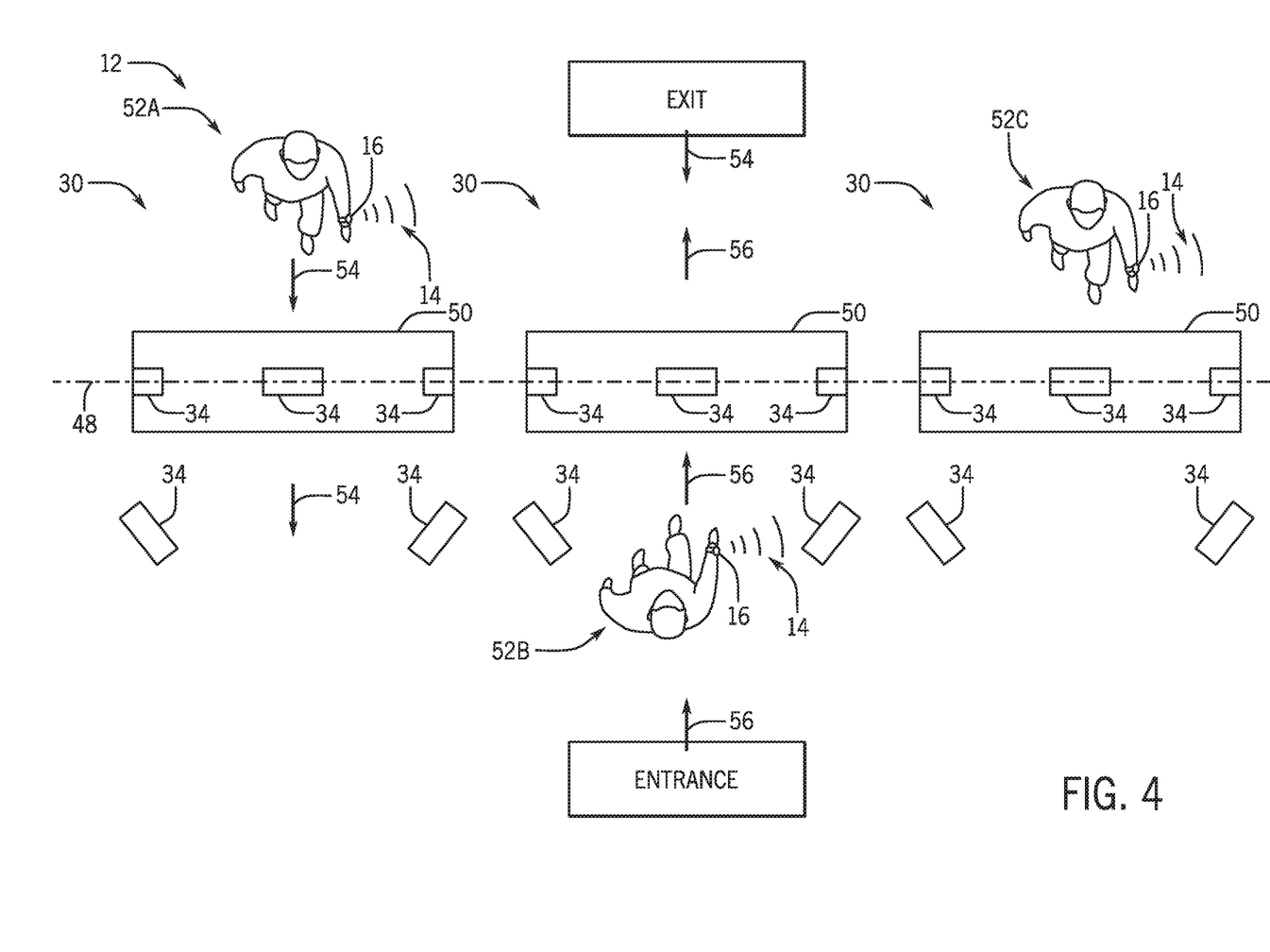
FIG. 4 is a top view of multiple receiver arrays, in accordance with an aspect of the present disclosure.

FIG. 4 illustrates a top view of multiple receiver arrays 30. Multiple receiver arrays 30 may be used to increase the volume of users 52 and/or reduce congestion/bottlenecking. Additionally, should traffic (e.g., pedestrian, vehicular) through one receiver array 30 be stopped, for example, to locate a wireless device 16 detected by the threshold detection system 12, continuing traffic may be diverted to other receiver arrays 30. Additionally or alternatively, the multiple receiver arrays 30, may communicate with each other and/or a larger network to provide location and/or wireless device 16 specific services. Furthermore, each receiver array 30 may be managed by a separate controller 12, or a single controller 12 may manage multiple receiver arrays 30.

As discussed above, the threshold detection system 12 may identify and distinguish between when a wireless device 16 enters or exits from a designated area (e.g., based on a determined direction of travel) or simply lingers in the vicinity of the threshold 48. To help illustrate, a first user 52A with a wireless device 16 may be exiting an area on interest (e.g., the amusement park, store, attraction, etc.) by traveling past the threshold 48 in the exiting direction 54. In one embodiment, when the wireless device 16 of the first user 52A crosses the threshold 48 while traveling in the exiting direction 54, the threshold detection system 12 may register the crossing and enact a response (e.g., a visual alert 44 and/or aural alert 46). Additionally, if a second user 52B with a wireless device 16 enters an area of interest by traveling past the threshold 48 in the entrance direction 56, a different response or no response may occur. By detecting the direction of travel, the threshold detection system 12 allows for a selectable response to different crossing of the threshold 48. Moreover, the threshold detection system 12 may also determine a lack of movement. For example, if a third user 52C lingers in the vicinity of the threshold 48, but does not significantly move in any direction, the threshold detection system 12 may register a non-crossing event. In any case, the wireless devices 16 of the users 52A, 52B, 52C may be detected by one or more receivers, but, depending on implementation, responses may be customized and/or the detections ignored depending on the direction of travel, or lack thereof, across the threshold 48.

Figure 5:
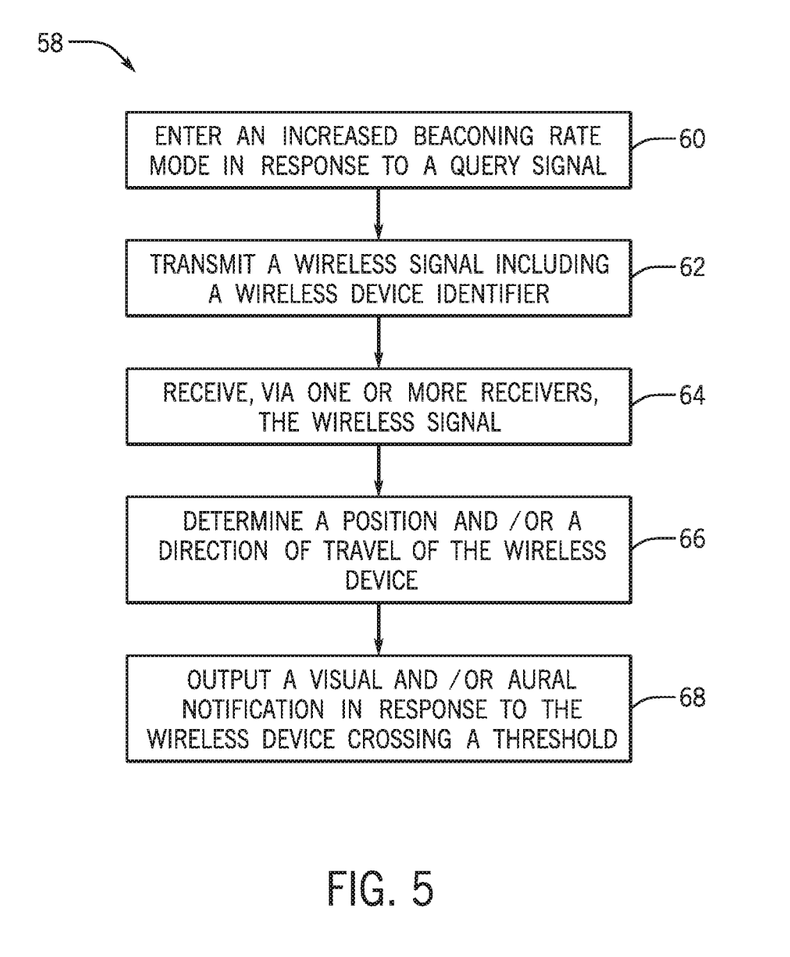
FIG. 5 is a flowchart for detection a wireless device crossing a threshold, in accordance with an aspect of the present disclosure.

In further illustration, FIG. 5 is a flowchart 58 of an example process of detecting a threshold crossing of a wireless device 16 by the threshold detection system 12. A wireless device 16 may enter an increased beaconing rate mode (e.g., a hyper-beaconing mode) in response to a query signal (process block 60). At the increased broadcasting rate, the wireless device 16 may transmit a wireless signal 14, which may include a wireless device identifier (e.g., a UUID) (process block 62). The threshold detection system 12 may then receive, via one or more receivers, the wireless signal 14 from the wireless device 16 (process block 64). The threshold detection system 12 may, for example via a controller 32, determine the position and/or direction of travel of the wireless device 16 (process block 66). Such a determination may also be associated with the device's wireless device identifier. The threshold detection system 12 may output a visual and/or aural notification in response to the wireless device 16 crossing a threshold 48 (process block 68). As mentioned above, the notification may also correspond to the direction of travel over the threshold 48. Although the above referenced flowchart 58 is shown in a given order, in certain embodiments, the depicted steps may be reordered, altered, deleted, and/or occur simultaneously. Additionally, the referenced flowchart 52 is given as an illustrative tool, and further decision and/or process blocks may be added depending on implementation.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A threshold detection system comprising:
   a plurality of wireless devices, wherein an individual wireless device of the plurality of wireless devices comprises a transmitter configured to transmit a wireless signal;
   a receiver array, comprising a plurality of receivers, wherein the plurality of receivers is configured to:
     detect the wireless signal of the individual wireless device of the plurality of wireless devices in response to the individual wireless device being in range of the receiver array; and
     generate detection signals in response to detecting the wireless signal of the individual wireless device; and
   a controller configured to:
     receive the detection signals from the plurality of receivers;
     determine that the individual wireless device is traveling in a first direction relative to a predetermined threshold based on the received detection signals;
     determine that the individual wireless device has crossed the predetermined threshold based at least in part on the received detection signals; and
     trigger an audio or visual alert in response to the determination that the individual wireless device has crossed the predetermined threshold and is traveling in the first direction.

2. The threshold detection system of claim 1, wherein the receiver array comprises an overhead receiver aimed down on the predetermined threshold, a first pair of side receivers positioned generally along a first height of the predetermined threshold, a second pair of side receivers positioned generally along a second height of the predetermined threshold, a pair of base receivers positioned proximate a base of the predetermined threshold and aimed toward a central region of the predetermined threshold, and a pair of offset receivers aimed toward the predetermined threshold from a distance away from the predetermined threshold.

3. The threshold detection system of claim 1, wherein the wireless signal comprises a Bluetooth signal.

4. The threshold detection system of claim 1, wherein the receiver array is configured to detect an additional wireless signal from an additional wireless device, wherein the controller is configured to trigger the audio or video alert based on a detection signal corresponding to the additional wireless device only upon a determination that the wireless signal comprises a unique identifier associated with at least one wireless device of the plurality of wireless devices.

5. The threshold detection system of claim 1, wherein the wireless signal comprises a wireless device identifier corresponding to the individual wireless device.

6. The threshold detection system of claim 1, wherein the controller is linked to a network configured for two-way communication with the individual wireless device.

7. The threshold detection system of claim 1, wherein the receiver array is configured to receive a second wireless signal from a second wireless device of the plurality of wireless devices and provide second detection signals to the controller, and wherein the controller is configured to:
   determine, based on the second detection signals, that the second wireless device has crossed the predetermined threshold and is traveling in a second direction away from the first direction, and in response to determining that the second wireless device crossed the predetermined threshold in the second direction, determine that no audio or visual alert is to be triggered.

8. The threshold detection system of claim 1, wherein the predetermined threshold comprises a threshold to a zone of interest, wherein the zone of interest comprises a locker or an open bin.

9. The threshold detection system of claim 1, wherein the receiver array is mounted at least partially on a frame, and wherein the predetermined threshold is along an axis through the frame.

10. The threshold detection system pf clam 1, wherein the controller is configured to enact the response based at least in part on the detection of the individual wireless device by only one receiver of the plurality of receivers.

11. The threshold detection system of claim 1, wherein the controller is configured to send a query signal to the individual wireless device, wherein the query signal is configured to place the individual wireless device in an increased beaconing mode.

12. The threshold detection system of claim 1, wherein the controller is configured to determine that the individual wireless device is traveling in the first direction based on a comparison of a first detection signal of first receiver of the plurality of receivers and a second detection signal of a second receiver of the plurality of receivers, wherein the first receiver and the second receiver are spaced apart from one another.

13. The threshold detection system of claim 12, wherein the controller is configured to determine a location of the individual wireless device based on the comparison, and wherein the response comprises a notification of the location of the individual wireless device.

14. The threshold detection system of claim 1, wherein the plurality of receivers is configured to detect a periodic broadcast of the individual wireless device.

15. The threshold detection system of claim 5, wherein the periodic broadcast of the individual wireless device to the plurality of receivers comprises one-way communication.

16. A method of detecting a wireless device comprising:
receiving, via one or more receivers, a wireless signal from a device, wherein the wireless signal comprises a Bluetooth signal, a WiFi signal, or a combination thereof;
determining a direction of travel of the device based at least in part on the reception of the wireless signal;
determining that the device has crossed a threshold in the direction of travel based at least in part on the reception of the wireless signal and the determined direction of travel; and
outputting a visual or aural notification in response to determining that the device has crossed the threshold.

17. The method of claim 16, comprising sending a query signal to the device, wherein the query signal is configured to increase a rate of signal transmission of the device.

18. The method of claim 16, comprising triangulating a position of the device based at least in part on detections of the wireless signal from the one or more receivers, wherein the one or more receivers comprises at least two receivers.

19. The method of claim 16, wherein outputting the visual or aural notification comprises outputting the visual or aural notification only if the direction of travel comprises a component in a predetermined direction.

20. A system comprising:
a plurality of receivers configured to detect a wireless signal from a device, wherein the plurality of receivers is configured to determine a position of the device in a vicinity of a threshold; and
a controller configured to:
send a query signal to the device, wherein the device is configured to shorten a time between subsequent transmissions of the wireless signal in response to the query signal;
determine whether the device has moved from a first side of the threshold to a second side of the threshold based at least in part on the wireless signal; and
output an identification of the position of the device in response to determining that the device has moved from the first side of the threshold to the second side of the threshold.

21. The system of claim 20, wherein the threshold comprises a virtual line separating a first geographic area from a second geographic area.

* * * * *